United States Patent

Cooperman

[15] 3,671,768

[45] June 20, 1972

[54] HIGH SPEED SET-RESET FLIP-FLOP

[72] Inventor: Michael Cooperman, Cherry Hill, N.J.

[73] Assignee: RCA Corporation

[22] Filed: Oct. 31, 1966

[21] Appl. No.: 590,830

[52] U.S. Cl. ..............................307/289, 307/215, 307/218, 307/221 R, 307/292

[51] Int. Cl. .................H03k 3/26, H03k 19/30, G11c 19/00

[58] Field of Search..................307/289, 290, 276, 218, 215, 307/221, 291, 292

[56] References Cited

UNITED STATES PATENTS

| | | | |
|---|---|---|---|
| 3,339,089 | 8/1967 | Bergman | 307/218 x |
| 3,381,232 | 5/1968 | Hoernes et al. | 307/218 x |
| 3,127,523 | 3/1964 | Jallen | 307/289 x |
| 3,201,773 | 8/1965 | Magee | 307/289 x |
| 3,219,845 | 11/1965 | Nleh | 307/289 x |

*Primary Examiner*—Donald D. Forrer
*Attorney*—John V. Regan

[57] ABSTRACT

A two input OR gate with resistive feedback between the output terminal and one of the input terminals of the OR gate. The second input terminal of the OR gate serves as s the set input terminal to the flip-flop and is normally maintained at a level indicative of a binary "0". To set the flip-flop, a voltage indicative of a 1 is momentarily applied to this set terminal. To reset the flip-flop, a voltage indicative of a zero is momentarily applied to the reset terminal of the flip-flop. The latter is coupled through a level shift circuit, including active element means, to the first input terminal of the OR gate.

7 Claims, 7 Drawing Figures

Inventor:
MICHAEL COOPERMAN
BY John V. Regan
Attorney

Inventor:
MICHAEL COOPERMAN
By John V. Regan
Attorney

HIGH SPEED SET-RESET FLIP-FLOP

In the usual type of flip-flop, two gates, such as NOR gates, have their outputs and inputs cross-coupled. Thus, in the case of positive NOR gates, for example, a positive going "set" pulse applied at an input of one gate causes the output thereof to go low. This low output then is coupled to an input of the other gate and causes its output to go high. The latter output, in turn, is coupled to an input of the first gate to maintain its output low. In general, the process is regenerative, although one output may reach its final state earlier than the other output.

Since two gates are involved in the storage loop, a total of two gate delays are required before both gate outputs reach a steady state after an input switching pulse. This total delay sets the minimum duration of the input switching pulse. The two gate delays, the variation in delay between the final (1) and (0) output levels, and the related requirement on the input pulse duration determine the maximum operating speed of the flip-flop. These same factors, plus the delay in interstage networks, determine the maximum operating frequency of a shift register which employs such flip-flops.

It is an object of this invention to provide storage circuits which have higher operating speeds than the conventional storage circuits.

It is another object of this invention to provide a set-reset flip-flop which achieves its final state in less than two gate delays.

It is still another object of this invention to provide an improved set-reset flip-flop which requires only one gate plus a few additional components.

Yet another object is to provide improved shift registers which employ flip-flops having the characteristics immediately aforementioned.

An improved flip-flop embodying the invention comprises an OR gate for binary "1" signals, the gate having first and second inputs and an output. A passive resistance feedback circuit is connected between the output and the first input of the gate. In addition, a diode has one electrode connected to the first input. Binary "0" signals selectively applied at a first input terminal are coupled to the other electrode of the diode, and binary "1" signals are selectively applied at the second input.

In the accompanying drawing, like reference characters denote like components, and:

FIG. 1b is a logic symbol used in the drawing to represent the gate of FIG. 1a;

FIG. 2 is a logic drawing illustrating the conventional manner of constructing both a flip-flop and a shift register stage using circuits of the type illustrated in FIG. 1a;

Figure 1A:
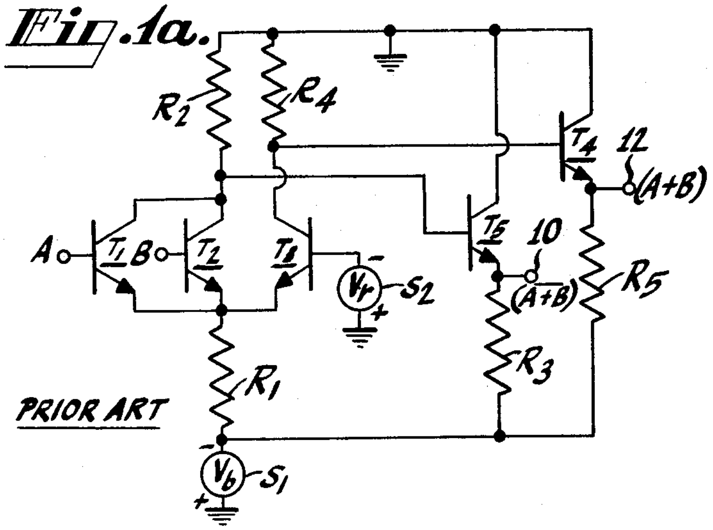
FIG. 1a is a schematic diagram of a known current steering logic gate.

The circuit illustrated in FIG. 1a is a known emitter-coupled current steering logic circuit, or gate, which comprises a current steering switch made up of transistors T1, T2 and T3, and a pair of output emitter follower transistors T4 and T5. An emitter resistor R1 has one of its terminals connected in common with the emitters of T1, T2 and T3 and has its other terminal connected to a point of fixed potential, illustrated as the negative terminal of a bias source S1 of $V_b$ volts. The positive terminal of source S1 is connected to a point of reference potential, illustrated by the conventional symbol for circuit ground.

Transistors T1 and T2 are the input transistors and have their base electrodes connected to receive input signals A and B, respectively. The collectors of these two transistors are connected together and by way of a collector supply resistor R2 to circuit ground. Also, these collectors are d.c. connected to the base of output transistor T5. Transistor T5 is connected in the grounded collector configuration, and has its emitter connected to an output terminal 10 and by way of an emitter resistor R3 to the bias source S1. The other transistor T3 of the current switch has its base electrode connected to a source of fixed potential, which is illustrated as a source S2 of $V_r$ volts, the positive terminal thereof being grounded. Transistor T3 has its collector connected to circuit ground by way of a supply resistor R4, and is connected to the base of output transistor T4. The latter transistor is connected in the grounded collector configuration and has its emitter connected to an output terminal 12 and by way of an emitter resistor R5 to the bias source S1.

This circuit, as will become clear, performs both the OR and NOR logic functions for the input signals A and B. Moreover, this circuit has a very high speed operation due to the fact that none of the transistors ever operate in saturation. Voltage source S2 is selected to provide a reference voltage $V_r$ which is intermediate the binary "1" and binary "0" signal levels applied at inputs A and B. In the usual case the value of $V_r$ is selected to be half-way between these two levels. By way of example, a binary "1" signal or level may have a value of −0.8 volt and a binary "0" may be represented by a signal or level of −1.6 volts. In that event, $V_r$ may have a value of −1.2 volts. Selecting $V_r$ to be mid-way between the binary "1" and binary "0" levels affords equal noise immunity to positive and negative noise spikes at the input. Source S1 provides a voltage of such magnitude that, together with the common emitter resistor R1, a substantially constant current source is provided for the emitter circuit.

In operation, current is steered either through one or both of transistors T1 and T2, or through transistor T3, in dependence upon the value of the input signals A and B. In particular, when either or both of the input signals A and B is a binary "1", i.e., −0.8 volt, current flows through collector resistor R2 and that one or both of the transistors T1 and T2 which are receiving binary "1" inputs. Transistor T3 is biased off at this time by the voltage at the common emitter junction. For this condition, the collector voltage of T3 is at ground potential. Assuming silicon transistors with an emitter-base drop of 0.8 volt, it may be seen that the output voltage at the emitter of transistor T4 is −0.8 volt, since its base is at ground potential. This output voltage corresponds to the binary "1" level. Thus, it may be seen that the output at terminal 12 is the logical OR function of the inputs A and B. Resistor R2 in the collector circuit of transistors T1 and T2 is selected in value so that the source current produces a voltage drop of 0.8 volt across resistor R2 when either T1 or T2, or both, conducts. This voltage, when applied at the base of output transistor T5 results in an output voltage at terminal 10 of −1.6 volts. Since this voltage represents a binary "0", it is seen that the output at terminal 10 is the logical NOR output of the circuit.

When both of the inputs A and B are binary "0", transistor T3 conducts all of the source current, and transistors T1 and T2 are biased off. The resulting ground potential at the collectors of T1 and T2, when applied to the output transistor T5, results in an output voltage of −0.8 volt at output terminal 10. Collector resistor R4 is chosen in value to produce a voltage drop of 0.8 volt when transistor T3 conducts. Thus, the voltage at output terminal 12 is −1.6 volts, representing a binary "0", when both of the inputs A and B are binary "0".

Figure 1B:
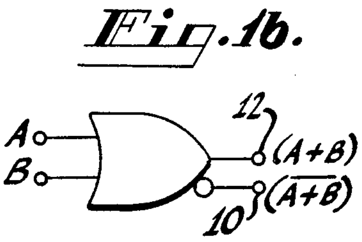

The circuit of FIG. 1a is represented in the drawing by the symbol illustrated in FIG. 1b. This symbol has gained wide acceptance as the symbol representing an OR gate. The small circle at output 10 of the gate indicates the output 10 is the OR function inverted, i.e., the logical NOR function.

Figure 2:
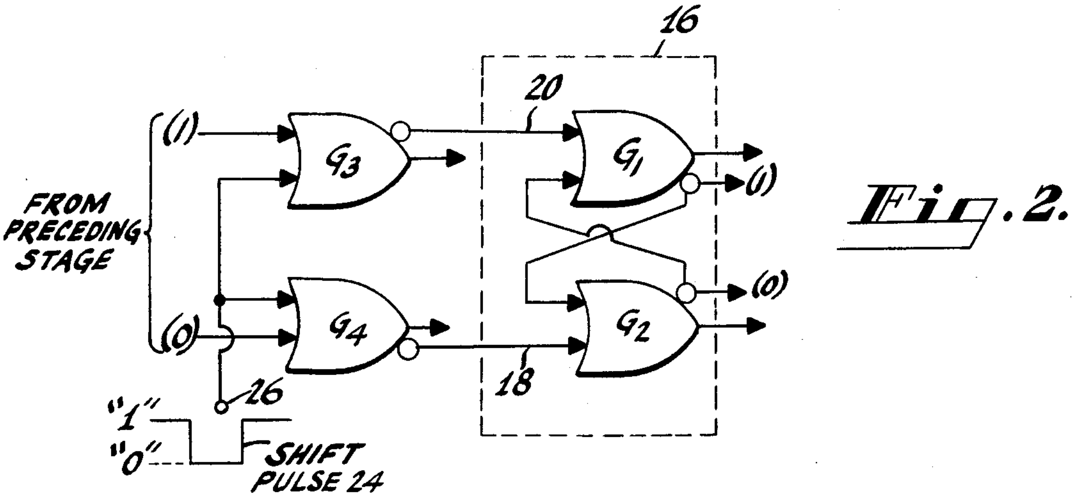

Conventionally, a set-reset flip-flop is constructed by cross-coupling the inputs and outputs of two NOR gates in the manner illustrated within the dashed box 16 of FIG. 2. The flip-flop may be switched to the set state by applying a binary "1" input signal on input line 18, and may be reset by applying a binary "1" signal on input line 20. When the flip-flop is used as a storage element in the shift register, the (1) and (0) outputs of the preceding shift register stage are applied as inputs to gates G3 and G4, respectively, the NOR outputs of which are applied at the inputs 20 and 18, respectively, of gates G1 and G2. Information from the preceding stage is shifted into flip-flop 16 by applying a negative going shift pulse 24 at a point 26 common to the second inputs of the gates G3 and G4. Gates G3 and G4 may be, for example, identical to the gates G1 and G2 for convenience in manufacturing the register in integrated form.

In the process of switching the flip-flop 16 from the reset to the set state, the state of the gate G1 cannot change until after the NOR output of gate G2 has changed. Thus, the output of gate G2 changes before the output of G1 changes. In practice, the switching process is a regenerative one, and the output of gate G1 may begin to change before the output of gate G2 has assumed its final state. Nevertheless, it generally is assumed that, in the case of two cross-coupled gates, a total switching time of two gate delays is required before both the (0) and (1) outputs reach their final states, one gate delay being due to the gate G2 and the other gate delay being due to the delay in gate G1. The flip-flop 16, in and of itself, therefore has a total switching time or delay of two gate delays. Considering a register stage, the total delay between the inputs to gates G3 and G4 and the outputs of the flip-flop 16 is three gate delays, the third gate delay being introduced by that one of the gates G3 and G4 which is enabled when the shift pulse 24 is applied. In order to provide a sufficiently wide clock and to be able to tolerate the variations in output delay, one or two additional gate delays may have to be added, which could bring the total delay between four and five gate delays. This total delay sets the minimum pulse width required for the shift pulse 24, and also determines the maximum operating speed or frequency of the shift register. In the interests of high speed operation, therefore, it is desirable to reduce this total delay, and especially to reduce the delay in the flip-flop 16. The manner in which this is accomplished by the present invention now will be described.

Figure 3:
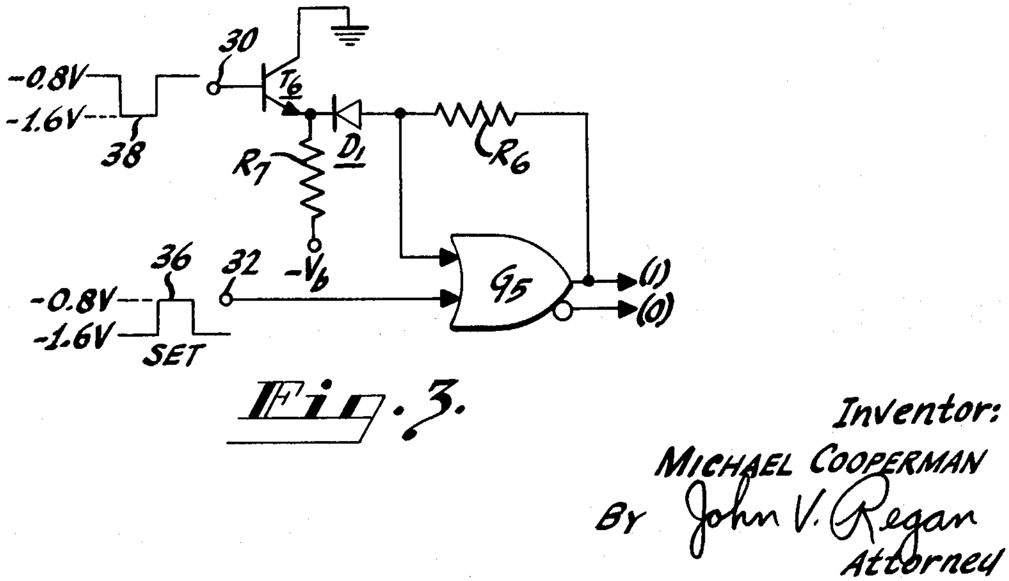
FIG. 3 is a drawing of a set-reset flip-flop embodying the invention.

FIG. 3 is a diagram of a set-reset flip-flop embodying the invention. This circuit includes a logic gate G5, which may be a current steering logic gate of the type described, although it also could be an OR gate if complementary outputs are not required of the flip-flop. A passive resistance feedback circuit is connected between the OR output of gate G5 and the first input thereof. This feedback circuit may comprise a resistor R6, as illustrated. A transistor T6 is connected in the common collector configuration and has its base electrode connected at a first input terminal 30. The emitter of this transistor is connected by way of resistor R7 to $-V_b$ volts, and by way of a diode D1 to the first input of the gate G5. In particular, when the gate G5 comprises NPN transistors, as illustrated in FIG. 1a, transistor T6 also is an NPN transistor and has its emitter connected to the cathode of diode D1. The anode of D1 is connected to the feedback resistor R6 at the input of the gate G5. D1 has a conduction characteristic which is similar to that of the emitter base junction of the transistor T6 and the transistors T1 . . . T5 of the gate G5. In particular, diode D1 has a forward voltage drop in the conducting state equal to the difference between the binary "0" and the binary "1" levels, or 0.8 volt for the values given heretofore.

The second input to the gate G5 is connected to a second input terminal 32. The voltage at this terminal normally is maintained at the binary "0" level of −1.6 volts. To set the flip-flop, a binary "1" signal is applied at input terminal 32 to raise the voltage thereat to −0.8 volt. The voltage at the first input terminal 30 normally is maintained at the binary "1" level of −0.8 volt. To reset the flip-flop, a binary "0" signal is applied at input terminal 30 to lower the voltage thereat to −1.6 volts.

Consider now the operation of the flip-flop. In the quiescent state, the voltage at the cathode of diode D1 is −1.6 volts due to the input voltage of −0.8 volt at input terminal 30 and the voltage drop of 0.8 volt across the emitter-base junction of transistor T6. Let it be assumed that a set pulse 36 is applied at second input terminal 32. This input drives the OR output of the gate to −0.8 volt (binary "1"). This output voltage is fed back through resistor R6 to the first input of the gate. Since the voltage at the cathode of D1 is −1.6 volts, and the drop across the diode D1 is 0.8 volt, it may be seen that the diode conducts little or no current at this time. Thus, the full output voltage of −0.8 volt is applied at the first input of the gate G5 to "latch" or hold the gate in the set state. The gate remains latched after the set pulse 36 terminates since the first input to the gate G5 remains at the binary "1" level.

In the FIG. 3 circuit, only one gate G5 is employed, as opposed to the two cross-coupled gates in the flip-flop 16 of FIG. 2. Thus, there is only one gate delay between the time of application of the set input pulse 36 and the new steady state output of the gate. The time required to switch the flip-flop of FIG. 3 from the reset to the set state then is one gate delay.

The flip-flop is reset by applying a binary "0" signal at first input terminal 30. When this reset pulse 38 is applied, the voltage at the cathode of diode D1 falls to −2.4 volts due to the emitter follower action of transistor T6. Diode D1 then conducts and clamps the voltage at its anode at −1.6 volts, equal to a binary "0". Current then is drawn from the OR output of gate G5 through R6 and diode D1, the drop across resistor R6 being equal to 0.8 volt at the onset. Since the voltage at the anode of D1 falls to −1.6 volts, gate G5 changes state, both inputs thereto then being binary "0" inputs. The OR output of the gate then changes to −1.6 volts, the binary "0" level. Concurrently, the NOR output of the gate G5 changes to the binary "1" level.

The total switching time required to reset the flip-flop comprises the delay in transistor T6 and the diode D1 plus the one gate delay in G5. Both the transistor T6 and the diode D1 are high speed devices, and since T6 operates as an emitter follower, the combined delay of this transistor and the diode is very short compared to the delay of gate G5. Consequently, for either the set or reset switching condition, the outputs of the gate G5 reach their final state in slightly more than one gate delay. The minimum required pulse width for the set and reset pulses may be as short as one gate delay, whereby the maximum operating speed of the flip-flop of FIG. 3 is approximately twice that of the flip-flop 16 of FIG. 2. Also, it may be seen from the drawing that this approximate doubling of speed is achieved with only a few components in addition to the single gate G5.

Figure 4:
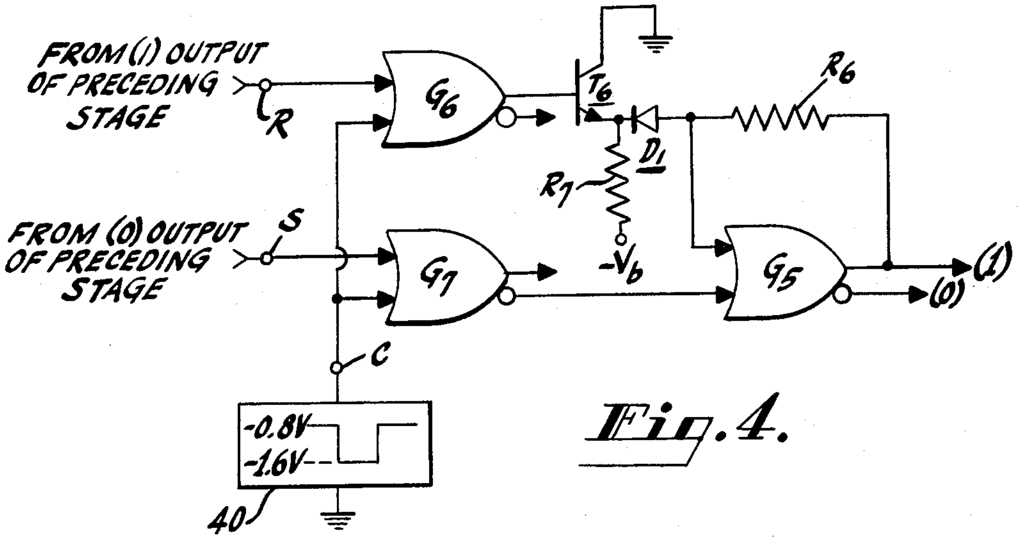
FIG. 4 is a diagram of a shift register stage, including an interconnecting network, embodying the flip-flop of FIG. 3.

The flip-flop of FIG. 3 may be employed as a storage element in a high speed shift register in the manner illustrated in FIG. 4. The arrangement of FIG. 4 differs from that of FIG. 3 by the addition of two gates G6 and G7. These gates may be similar to the gate G5. Gate G6 has its OR output coupled to the base of transistor T6, and gate G7 has its NOR output coupled to the second input of the gate G5. The first input to gate G6 is coupled to the (1) output terminal of the flip-flop in the preceding stage, and the first input to the gate G7 is coupled to the (0) output terminal of the preceding stage. Both gates have their second inputs connected to a source 40 of shift pulses. These shift pulses are negative going pulses corresponding to binary "0" inputs. That is to say, the output of the pulse source 40 normally is at −0.8 volt, corresponding to a binary "1" level, and the output of the pulse source 40 falls to −1.6 volts, corresponding to the binary "0" level during the pulse period.

Let it be assumed that the preceding flip-flop (not shown) is storing a binary "1". The (1) output thereof, applied at the first input of gate G6 then is a binary "1", and the (0) output applied to the gate G7 is a binary "0". When a shift pulse is applied to the gates G6 and G7 from source 40, the NOR output of gate G7 is switched from a binary "0" to a binary "1" condition, since both inputs to the gate G7 then are binary "0" signals. This binary "1" input to gate G5 drives the OR output thereof to the binary "1" level of −0.8 volt, and drives the NOR output thereof to the binary "0" level. The −0.8 volt OR output of gate G5 is fed back through resistor R6 to the first input of G5 and locks gate G5 in the "1" state after the shift pulse terminates. Thus, the total time required to shift in a binary "1" from a previous state is equal to the one gate delay of G7 plus one gate delay in G5, or a total of two gate delays.

Let it be assumed now that the preceding flip-flop is storing a binary "0". The (1) output thereof coupled to the first input of gate G6 then is −1.6 volts, and the (0) output coupled to the first input of gate G7 is −0.8 volt. In the steady state condition (no shift pulse) the NOR output of gate G7 is maintained at the binary "0" level by the −0.8 volt input from the clock source 40. Concurrently, the OR output of gate G6 is held at −0.8 volt due to the input from the clock source 40, irrespective of the inputs from the preceding stage. When a shift pulse is applied at the second inputs to the gates G6 and G7, the output of G7 remains unchanged. However, both inputs to gate G6 now are at −1.6 volts, and the OR output thereof falls to −1.6 volts. This drop in voltage tends to lower the voltage at the cathode of D1 to −2.4 volts, thereby causing diode D1 to conduct and draw current through resistor R6 from the OR output of gate G5. The voltage at the anode of diode D1, and at the first input of gate G5 then falls or decreases by 0.8 volt to the binary "0" level of −1.6 volts. Both inputs to gate G5 now are at the binary "0" level, forcing the flip-flop to the "0" state in which the OR output becomes −1.6 volts and the NOR output becomes −0.8 volt. Once the OR output falls to −1.6 volts, diode D1 becomes nonconducting, or substantially so, and the feedback resistor R6 maintains the first input of G5 at the binary "0" level.

The total time required to reset the flip-flop is just slightly more than two gate delays, made up of the one gate delay in G6, the small delay through transistor T6 and diode D1, and the one gate delay in G5. Thus, to shift either a binary "1" or a binary "0" into the flip-flop from the preceding stage requires a maximum of just slightly more than two gate delays as contrasted to the three or more gate delays in the register stage of FIG. 2. By comparison of FIGS. 2 and 4, it may be seen that the FIG. 4 arrangement requires only three gates plus a resistor, a diode and a transistor, whereas the arrangement of FIG. 2 requires four gates. Moreover, the shift pulse in FIG. 4 may be of shorter duration than the shift pulse in FIG. 2, whereby a shift register comprising stages as illustrated in FIG. 4 may operate at a higher frequency than a shift register comprising stages of the type illustrated in FIG. 2.

Figure 5:
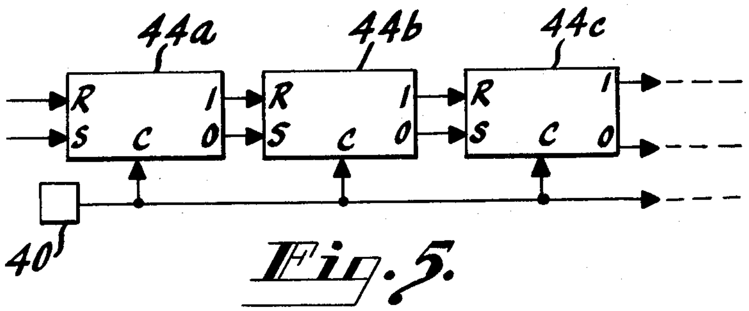
FIG. 5 is a block diagram of a shift register.

A shift register of three stages is illustrated in block form in FIG. 5. Each of the stages 44*a*, 44*b* and 44*c* is identical, and each of these stages includes the circuitry of FIG. 4 with the exception of the shift pulse source 40, which is common to all of the stages.

Figure 6:
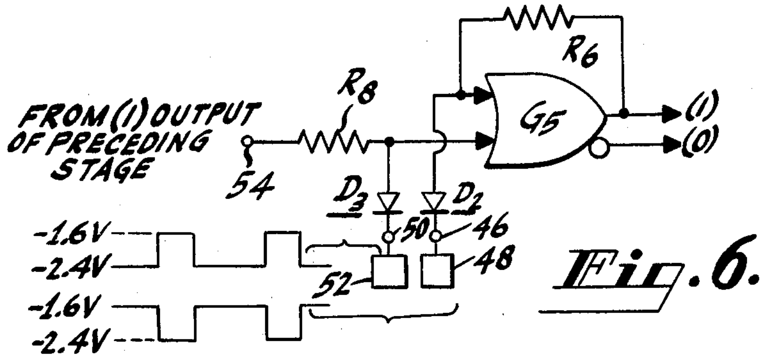
FIG. 6 is a diagram of another flip-flop arrangement embodying the invention and suitable for use in a shift register.

A further embodiment of the invention is illustrated in FIG. 6, which embodiment may be used either as a clocked set-reset flip-flop, or as a shift register stage. The FIG. 6 circuit comprises a gate G5 of the type described hereinabove. A passive resistance feedback circuit, such as one comprising the resistor R6, is connected between the OR output of gate G5 and the first input thereof. This first input also is connected by way of a diode D2 to a terminal 46, which terminal is connected to the output of a first clock source, or shift source 48. The second input to the gate G5 is connected by way of a second diode D3 to an input terminal 50, which input terminal is connected at the output of a second clock or shift source 52. This second input to gate G5 is also coupled, as by way of a resistor R8 to a signal receiving input terminal 54.

The waveforms of the outputs of clock sources 48 and 52 are illustrated adjacent these sources. As shown in the drawing, the signals provided by the sources 48 and 52 are complementary. The voltage levels of the signals are chosen with the assumption that the voltage drops across diodes D2 and D3 are equal to the difference between the binary "0" and binary "1" signal levels, i.e., 0.8 volt.

In the steady state operating condition, source 52 provides an output of −2.4 volts at the cathode of diode D3. Diode D3 operates to maintain the voltage at the second input of gate G5 at the binary "0" level. Thus, if the input signal applied at input terminal 54 is a binary "0" signal of −1.6 volts, little or no current is drawn through the diode D3 and the input signal is applied at the second input of gate G5. However, if the input signal is a binary "1" signal of −0.8 volt, diode D3 conducts and draws current through resistor R8 to clamp the voltage at the second input of gate G5 at −1.6 volts. In the steady state condition, source 48 applies a voltage of −1.6 volts at the cathode of diode D2.

Let it be assumed that the flip-flop is storing a binary "0", in which case the OR output (the (1) output) of gate G5 is at the binary "0" level of −1.6 volts. This voltage is fed back through R6 to the second input of gate G5 to maintain this condition. Let it be assumed that the input at terminal 54 is a binary "1" level. During the shift period, source 52 raises the voltage at the cathode of D3 to −1.6 volts. Since the drop across this diode is 0.8 volt, it may be seen that the diode D3 remains nonconducting or only slightly conducting during the shift period for the input condition given. The binary "1" input signal then is applied to the second input of gate G5 and switches the state of the flip-flop, forcing the (1) output of gate G5 to the binary "1" level of −0.8 volt. Shift source 48 is applying a voltage of −2.4 volts at the cathode of D2 at this time. During the shift period, current is drawn from the (1) output of G5 and through R6 and the diode D2, the diode D2 operating to clamp the voltage at the first input of G5 at the binary "0" level. At the termination of the shift pulse, D3 again clamps the second input of G5 at the binary "0" level. Diode D2 now becomes nonconducting since its cathode voltage is −1.6 volts and the feedback voltage is −0.8 volt. Thus, the feedback loop becomes operative to feed back the full output voltage to the first input of gate G5 and lock the flip-flop in the binary "1" state.

Let it be assumed that the signal at input terminal 54 is a binary "0" when the next set of shift pulses is applied. This input passes to the second input of gate G5. Diode D2 conducts during the shift period and clamps the first input of gate G5 at the binary "0" level. Both inputs to the gate are now at the binary "0" level, whereby the flip-flop is forced to the "0" state.

The total time required to switch the flip-flop is one gate delay (the delay in G5) plus the very small delay through the diode D2 or D3, which is negligible in comparison to the gate delay. When the flip-flop of FIG. 6 is employed as a stage in a shift register, only the (1) output of the preceding flip-flop is coupled to an input of the gate G5, although each flip-flop stage has both a (1) and (0) output. In those instances wherein only the (1) output of a flip-flop is required, the gate G5 may be a gate having only an OR output. For example, a circuit of the type shown in FIG. 1*a* may be employed with the modification that the transistor T5 therein and its associated circuitry may be omitted.

What is claimed is:

1. In a system wherein a binary "1" is represented by a signal or level of Vl volts and a binary "0" is represented by a signal or level of Vo volts, where $Vo \neq Vl$, the combination comprising:

a first OR gate for binary "1" signals having first and second inputs and an output;

said OR gate is a current steering logic circuit comprising first, second and third transistors of the same conductivity type each having a collector, an emitter and a base; an emitter resistor common to each of the first, second and third transistors; means connecting the collectors of the first and second transistors in common with each other; a collector supply resistor connected to the collector of the third transistor; means for connecting the base of the third transistor to a source of bias potential having a value intermediate the values $Vo$ and $Vl$; means coupling the bases of the first and second transistors to the first and second inputs, respectively, of the OR gate; and a fourth transistor connected in the common collector configuration and having a base coupled to the collector of said third transistor and an emitter coupled to the output of said OR gate;

a passive resistance feedback circuit connected between the output of the OR gate and the first input thereof;

a diode having one electrode connected to said first input;

a first input terminal coupled to the other electrode of said diode such that said diode is connected in a direction to be forward biased when the output of said OR gate is a binary "1";

a second input terminal coupled to the second input of said OR gate;

means for selectively applying a binary input signal at said first input terminal; and means for selectively applying a binary input signal at said second input terminal.

2. The combination as claimed in claim 1, including means for quiescently biasing the first input terminal at a value ≅ $V1$, and means for quiescently biasing the second input terminal at a value ≅ $Vo$.

3. In a system wherein a binary "1" is represented by a signal or level of $V1$ volts and a binary "0" is represented by a signal or level of $Vo$ volts, where $Vo \neq V1$, the combination comprising:

a first OR gate for binary "1" signals having first and second inputs and an output;

a passive resistance feedback circuit connected between the output of the OR gate and the first input thereof;

a diode having one electrode connected to said first input such that said diode is connected in a direction to be forward biased when the output of said OR gate is a binary "1" and the voltage drop across said diode is approximately equal to the difference between $V1$ and $Vo$ volts when said diode is conducting;

a first input terminal;

a transistor connected in the common collector configuration and having an emitter connected to the other electrode of said diode, and a base connected to said first input terminal, wherein said diode is coupled to said first input terminal via the emitter-base junction of said transistor, and wherein said diode and said emitter-base junction are connected in series opposition;

a second input terminal coupled to the second input of said OR gate;

means for selectively applying a binary input signal at said first input terminal; and means for selectively applying a binary input signal at said second input terminal.

4. The combination as claimed in claim 3, wherein the means for selectively applying an input signal at the first input terminal includes a second OR gate having an output connected to the first input terminal and having first and second inputs; wherein the means for applying a signal at the second input terminal includes a NOR gate having an output connected to said second input terminal and having first and second inputs; means for applying at the first inputs of the second OR gate and the NOR gate binary signals which are respectively complementary; and means for applying binary "0" control signals intermittently and concurrently at the second inputs of both said second OR gate and said NOR gate.

5. An N stage shift register, wherein each stage comprises first and second OR gates and a NOR gate as claimed in claim 4, wherein the means for applying a binary signal at the first input of the second OR gate of a stage is a connection between that first input and the output of the first OR gate of the next preceding stage; and wherein the means for applying binary "0" control signals is a shift pulse source having its output coupled to the second inputs of the second OR gate and said NOR gate in each of the N stages.

6. In a system wherein a binary "1" is represented by a signal or level of $V1$ volts and a binary "0" is represented by a signal or level of $Vo$ volts, where $Vo \neq V1$, a latching circuit comprising, in combination:

a current steering logic circuit having first and second inputs and an OR output;

a passive resistance feedback circuit connected between the OR output and the first input of said logic circuit;

first, second and third input terminals;

a first diode connected between said first input and said first input terminal;

a second diode connected between said second input and said second input terminal;

means for applying at the first input terminal a first control input which varies between first and second voltage levels and for simultaneously applying at the second input terminal a second control input which varies between said first and second levels and which is opposite in sense to the first control input;

means coupling the third input terminal to said second input of the logic circuit; and means for applying a binary input signal at the third input terminal.

7. The combination as claimed in claim 6, wherein the first control level has a value to clamp the voltage at said first input of the logic gate close to $Vo$ volts, and the second control level has a value to prevent conduction through said second diode unconditionally.

* * * * *